US009234495B2

(12) United States Patent
Anteau (10) Patent No.: US 9,234,495 B2
(45) Date of Patent: Jan. 12, 2016

(54) POWER GENERATOR

(76) Inventor: Mark R. Anteau, Columbus, OH (US)

(*) Notice: Subject to any disclaimer, the term of this patent is extended or adjusted under 35 U.S.C. 154(b) by 484 days.

(21) Appl. No.: 13/537,046

(22) Filed: Jun. 28, 2012

(65) Prior Publication Data

US 2013/0019971 A1 Jan. 24, 2013

Related U.S. Application Data

(60) Provisional application No. 61/501,870, filed on Jun. 28, 2011.

(51) Int. Cl.
*F16D 31/02* (2006.01)
*F03B 17/02* (2006.01)

(52) U.S. Cl.
CPC ............. *F03B 17/025* (2013.01); *Y02E 10/20* (2013.01); *Y10T 137/86187* (2015.04)

(58) Field of Classification Search
CPC ........ F03B 15/00; F03B 15/14; F03B 17/005; F03B 17/02; F03B 17/025; F03G 7/04
USPC .......................... 60/398, 495–507; 290/42, 53
See application file for complete search history.

(56) References Cited

U.S. PATENT DOCUMENTS

| | | | | |
|---|---|---|---|---|
| 3,648,458 A * | 3/1972 | McAlister | | 60/415 |
| 4,450,690 A | 5/1984 | Clark, Jr. | | |
| 4,617,801 A * | 10/1986 | Clark, Jr. | | 62/116 |
| 4,819,697 A * | 4/1989 | Randa et al. | | 138/30 |
| 4,883,411 A * | 11/1989 | Windle | | 417/331 |
| 5,329,497 A | 7/1994 | Previsic et al. | | |
| 5,426,332 A * | 6/1995 | Ullman et al. | | 290/53 |
| 6,250,199 B1 * | 6/2001 | Schulte et al. | | 91/4 R |
| 7,926,501 B2 * | 4/2011 | Springett et al. | | 137/14 |
| 2010/0194116 A1 * | 8/2010 | Mahawili | | 290/55 |
| 2011/0258996 A1 * | 10/2011 | Ingersoll et al. | | 60/421 |
| 2012/0167563 A1 | 7/2012 | Cherepashenets et al. | | |

* cited by examiner

*Primary Examiner* — Craig Schneider
*Assistant Examiner* — Angelisa L Hicks
(74) *Attorney, Agent, or Firm* — Standley Law Group LLP (57) ABSTRACT

The power plant disclosed is an engine that derives is usefulness in the pursuit of energy generation by utilizing natural pressure differentials found in various liquids and gases, such as but not limited to water and air. It is generally a two-stroke piston cycle engine, wherein the actions of the pistons perform work, which can be utilized to generate power, pump fluids, or perform work, for example.

15 Claims, 11 Drawing Sheets

POWER GENERATOR

CROSS-REFERENCE TO RELATED APPLICATIONS

This application claims priority to provisional patent application having the Ser. No. 61/501,870 and filed Jun. 28, 2011 and incorporates its disclosure herein by reference.

STATEMENT REGARDING FEDERALLY SPONSORED RESEARCH

None

BACKGROUND

This disclosure relates to the field of power generation, and more specifically to hydroelectric power generation methods based on renewable energy and pressure differential principles.

As energy sources based on fossil fuels become ever more expensive to maintain and their environmental cost is realized and quantified, the world has turned to renewable energy sources to combat these disadvantages of traditional energy generation methods. A sharply increasing demand curve continues to push the need for innovative new ways to generate power. There is thus a current need for new sources of energy that utilize renewable sources to generate that energy.

A particularly salient obstacle to power generation is the power input needed for use in the generation scheme. The input power required will inherently reduce the efficiency, and therefore the viability of, the system. Therefore, there is a need for a power generation scheme that utilizes natural phenomenon to both reduce the input power required to operate the system and to provide the energy source that the system converts to some form of usable energy.

SUMMARY

The Drummer Boy is a variation of, and improvement on, the Drummer Rose (DR)/BF Hydroelectric System and Pump described in provisional application No. 61/501,870. The Drummer Boy is a renewable energy generating hydroelectric power plant that exploits natural pressure differentials to harness a renewable source of power. It preferably provides a constant rate of electricity or mechanical work twenty-four hours a day for as long as necessary. It is designed to provide alternating current (AC), direct current (DC), or direct mechanical force.

The Drummer Boy is an engine that derives is usefulness in the pursuit of energy generation by utilizing natural pressure differentials found in various liquids and gases, such as but not limited to water and air. The Drummer Boy is generally a two-stroke piston cycle engine, wherein the actions of the pistons perform work, which can be utilized to generate power, pump fluids, or perform work, for example.

BRIEF DESCRIPTION OF THE DRAWINGS

For a fuller understanding of the nature and advantages of the present disclosure, reference should be had to the following detailed description taken in connection with the accompanying drawings, in which.

DETAILED DESCRIPTION

The Drummer Boy is an electric power plant that incorporates a new efficient system and method of extracting and converting energy through fluid flow based upon renewable energy. It preferably provides a constant rate of power twenty-four hours a day for as long as necessary. It is designed to provide alternating current (AC), direct current (DC), or direct mechanical force.

The Drummer Boy can be perceived as an engine that runs on water or some other suitable liquid, gas, or combination of liquids and gases, which make up the "fuel" that operates its two-stroke piston cycle. The fluid flow through the system due to pressure differentials performs the work. Two examples of work that can be performed are electricity generation and pumping fluids. Direct mechanical work can be performed as needed as well, depending on the application and environmental circumstances.

The Drummer Boy is made up of a power station that performs work and a return system that evacuates the water from the power plant and returns it back to the head. The exact specifications disclosed herein including, but not limited to shapes, sizes, positioning of components, the elevation/depth of components and materials utilized will be chosen by those skilled in the art to meet particular application parameters, and should be tested for maximum efficiency. Additionally, any design specifications mentioned in this document are merely illustrative of the operation of the overall system. These calculations and tests are within the abilities of one skilled in the art of power generation and fluid dynamics, enabling them to practice the invention disclosed herein without undue experimentation or further invention.

Additionally, the diagrams that are presented herein merely serve to facilitate the explanation of the principles of operation of the Drummer Boy system and its various methods of operation and are not meant to imply exact scale of any particular design that has been engineered for a specific purpose. The relative volumes and configurations of various power plant components, which will vary according to individual needs and certain applications, will be of particular importance to efficiency results. Certain features depicted in the figures that follow have been exaggerated in order to more clearly explain the principles taught by this disclosure.

Furthermore, the structural frame supporting the power plant, the support frame and configuration of pontoons, as well as mechanical systems, electronic devices, and general control systems utilized in the operation of this system are not described but they are implied. Control systems will need to be employed in any given application of the invention to operate doors and coordinate the timing of the various systems, pumps, doors, multiple return stations, etc. Control systems and electronic devices can include but are not limited to computers, smart boards, motors, microwave devices, sensors and solenoids required to operate doors, pumps, valves, vents, generator connections and other operational systems. Again, the design of these systems and devices is within the ability of one skilled in the relevant arts without undue experimentation or further invention, and may vary depending on the particular application on which the invention is being implemented.

The Drummer Boy can operate in a various environments such as but not limited to: lakes, oceans, above ground, below ground, under water, space stations, man-made reservoirs (including tanks), combinations thereof, as well as other environments. Placing the Drummer Boy in a man-made reservoir enables this type of power plant to operate away from large sources of water such as but not limited to: oceans, lakes, and rivers. The water supply for the man-made reservoir can be supplied by items such as but not limited to: a pipe system, water tankers (trains, trucks, ships, barges, planes, jets, helicopters, blimps), and underground water. The size of this type of reservoir and the size of the Drummer Boy being placed inside of it depends upon the amount of work or electricity desired.

Although this specification discloses the Drummer Boy primarily using water and air in its operation, any suitable liquid or gas can be substituted or combined if desirable for a particular application. One example would be to add something to the water to inhibit the water from freezing in very cold climates. Another might utilize natural liquids or gases present nearest to the point of power need, such as bodily fluids for small applications. If something is used other then water to generate electricity by the power plant that is environmentally unfriendly, then the Drummer Boy may need to be placed in a man-made reservoir and its water supply recycled so there is no adverse impact on the environment.

This type of power plant can be built and operated as a source for distributed allocation of electric power allowing it to provide electricity to a power grid system. Connecting Drummer Boy to a power grid system would allow the power plant to provide electricity to large regions such as but not limited to towns, cities, counties, districts, provinces and states. The Drummer Boy can also be designed as a single free standing unit or a system of interconnecting units to provide electricity to specific facilities such as but not limited to: manufacturing plants, shopping malls, stores, office buildings, hospitals, military bases, multifamily residences, single family homes, ocean liners, cargo ships, oil tanker ships, naval vessels as well as other facilities. Additionally, the Drummer Boy can be designed as a portable unit to provide electricity for: military camps and mobile combat units, commercial functions like fairs and construction sites, private uses like camping and recreation, as well as providing electricity to other entities and other functions. Drummer Boy can be scaled down to power an artificial heart or pump blood. The operation of the Drummer Boy in a tank allows it to be utilized in various environments as a source for distributed allocation of electricity, as a single freestanding unit or system, and as a portable unit. It can be used on-site at, for instance, oil and gas well locations as a means for pumping materials to the surface. It can be scaled up or down in size to meet the desired requirements.

The Drummer Boy's return system can be incorporated into existing hydroelectric power plants to enable them to return water back to the head at considerable energy and economic savings. This will allow these existing hydroelectric power plants to preferably operate 24 hours a day for as long as necessary without severely affecting the water level of the head and at the same time allowing the power plant to become increasingly economically efficient and environmentally friendly. Additionally, parts of the Drummer Boy can be added to submarines and other entities to improve their efficacy in evacuating water from their ballast tanks, as well as improve the energy consumption during the transmission of low-pressure fluids into higher-pressure fluids. The aforementioned examples represent only two of many ways in which the Drummer Boy or components of the Drummer Boy can be incorporated to enhance current technology.

The reason that the invented system generates electricity that can be used outside the power plant is because a natural source of renewable energy—e.g.,water—provides the vast majority of the work needed to generate the power or electricity, and that same water is recycled in the power plant to help evacuate the water that enters the power plant, and because hydrostatic pressure maintains the head of water in the connecting pipes between the pontoon chambers and their respective pumping systems at the point of discharge from the power plant. The force of the invention's pontoon systems are in a state of potential energy when they are at rest either at the top or bottom of their respected pontoon chambers—depending on the particular configuration being employed. When the pontoons move downward or upward, their potential energy transforms into kinetic energy. Since the driving force behind the pontoons is buoyancy, the pontoons provide a free source of natural energy.

The same principles apply to systems placing the connecting rod systems and the coil tube systems at or just below a state of neutral buoyancy. The skilled artisan may employ the state of buoyancy that best accomplishes the goals of the invention in accordance with a particular application. References to neutral or nearly-neutral buoyancy herein thus refer to component buoyancy states that may be altered or adjusted during operation of the invention to achieve desired positive, negative or neutral buoyant forces with respect to the weight of a component.

Figure 1:
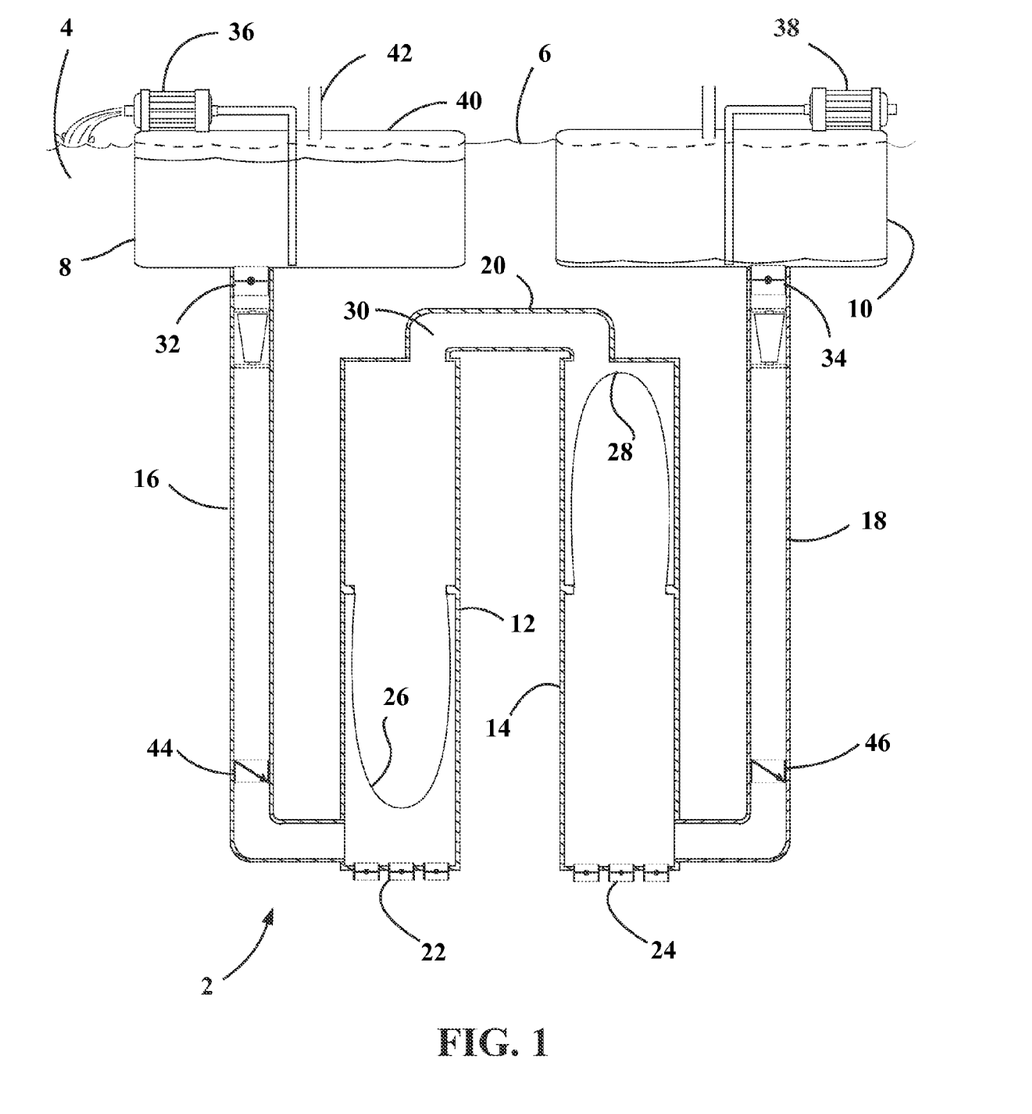
FIG. 1 depicts a preferred first embodiment of the invention utilizing fluid flow turbine generators to generate power at beginning of a stroke.

Turning to FIG. 1, the basic principles that serve as a basis for the current invention are described. FIG. 1 depicts the general principles and features of the invention in an embodiment of a proof-of-concept model. The power system 2 is generally depicted secured within a body of water or reservoir 4 having a surface level 6. The fluid in which the power system 2 operates need not be water and can consist of any nearly incompressible fluid with comparable characteristics. Water was merely chosen as the preferred medium due to its natural pervasiveness and ease of use, and is used throughout this disclosure for illustrative, but not limiting, purposes.

A basic feature of the invention is the continuous and cyclical filling of return chambers that occurs as the fluid within the boundaries of the power system 2 reaches equilibrium pressure levels when exposed to the surrounding reservoir 4. For example, FIG. 1 depicts a first holding tank 8 and a second holding tank 10. The first holding tank 8 and the second holding tank 10 are each connected to a first power chamber 12 and a second power chamber 14, respectively. The first holding tank 8 is connected to the first power chamber 12 via a first evacuation tube 16, and the second holding tank 10 is connected to the second power chamber 14 via a second evacuation tube 18. The volumes of both the first power chamber 12 and the second power chamber 14 are connected via a connecting pipe 20 to enable fluid flow between the chambers 12 and 14.

Both the first power chamber 12 and the second power chamber 14 can be put in fluid flow connection with the reservoir 4 external to the power system 2 via a first power chamber external valve 22 and a second power chamber external valve 24, respectively. The first 22 and second 24 power chamber external valves may actually consist of multiple gates or valves positioned across the bottom of the first 12 and second 14 power chambers, or a single gate or valve configuration may be used. Depending on the application demands, multiple, smaller gates as shown in FIG. 1 may be desirable if short cycle times are required and it is determined that such a configuration allows for a smaller transition to full flow capacity than that available with a single, larger gate. Throughout this disclosure, the terms first and second power chamber external valve should be construed as covering both multiple or single valve configurations for convenience.

The first power chamber 12 includes a first elastic boundary 26 comprised of an elastic material and separating a top portion of the first power chamber 12 from the bottom portion of the first power chamber 12 with respect to fluid flow. The first elastic boundary 26 can be expanded and contracted as needed, and transmits pressure changes through the boundary while inhibiting fluid flow between the top and bottom portions of the first power chamber 12. Likewise, the second power chamber 14 includes a second elastic boundary 28 having similar characteristics. In the particular configuration shown in FIG. 1, these elastic boundaries 26 and 28 are included as helpful visualizations and are illustrative of the operation of the proof-of-concept model. They define a constant volumetric flow region 30 that includes the top portion of both the first 12 and second 14 power chambers, as well as the interior of the connecting pipe 20. The movement of the constant volumetric flow region bounded by the elastic boundaries 26 and 28 (which experiences no or a de minimus change in the volume of fluid contained therein) in the following detailed description of FIG. 1 and the figures that follow will illustrate principles of the current invention.

Each holding tank is connected to the distal end of its corresponding evacuation tube. At each connection point exists a holding tank valve, such as the first holding tank valve 32 for the first holding tank 8 and a second holding tank valve 34 for the second holding tank 10. The main purpose of the holding tanks is to receive a volume of fluid as it flows through the system, isolate it from the rest of the system, and return its contents into the fluid body reservoir 4 by pumping the short head of fluid contained within. Also, each evacuation chamber can optionally include various check valves, such as the first evacuation tube check valve 44 for the first evacuation tube 16 and the second evacuation tube check valve 46 for the second evacuation tube 18.

For example, FIG. 1 shows a first holding tank pump 36 and a second holding tank pump 38. Each is to be used to return fluid in its corresponding holding tank to the fluid body reservoir 4 once the filling of the holding tank is complete and it is isolated in fluid flow from the rest of the system by the closing of the corresponding holding tank valve. Here, the first holding tank 8 has been filled and isolated from the first evacuation tube 16, and the first holding tank pump 36 has begun evacuating the fluid from the first holding tank 8 thereby returning it to the fluid body reservoir 4.

Several considerations should be noted with respect to the holding tanks and their configurations. First, each holding tank used in an application should generally be shaped with a large horizontal area relative to the height of the holding tank. Such a configuration will lower the work that must be done by the holding tank pump to return the fluid to the fluid body by reducing the elevation head across the pumping cycle.

Second, the holding tanks may, but need not necessarily be, open to atmospheric pressure. Such a configuration will allow the system to return to equilibrium with the exterior environment more easily, is thought to increase overall efficiency, and may avoid complications caused by pumping in a vacuum. For example, as shown in FIGS. 1-4, the top surface 40 of the first holding tank 8 can be either closed to create a sealed enclosure, or it can be open to the atmosphere. Alternatively, actuatable air valves can be contained within vents, such as at 42, in order to achieve the characteristics of having the holding tanks open to the atmosphere above the fluid body reservoir 4.

FIG. 1 depicts the power system 2 in a state in which the constant volumetric flow region 30 is shifted largely into the first power chamber 12. That is, the majority of the fluid volume defined by the first 26 and second 28 elastic boundaries is positioned within the first power chamber 12. The first holding tank 8 has just been filled with water. The first holding tank valve 32 has been closed, and the first holding tank pump 36 has commenced evacuation of the water back into the reservoir 4. The second holding tank 10 is empty and the second holding tank valve 34 is closed.

Figure 2:
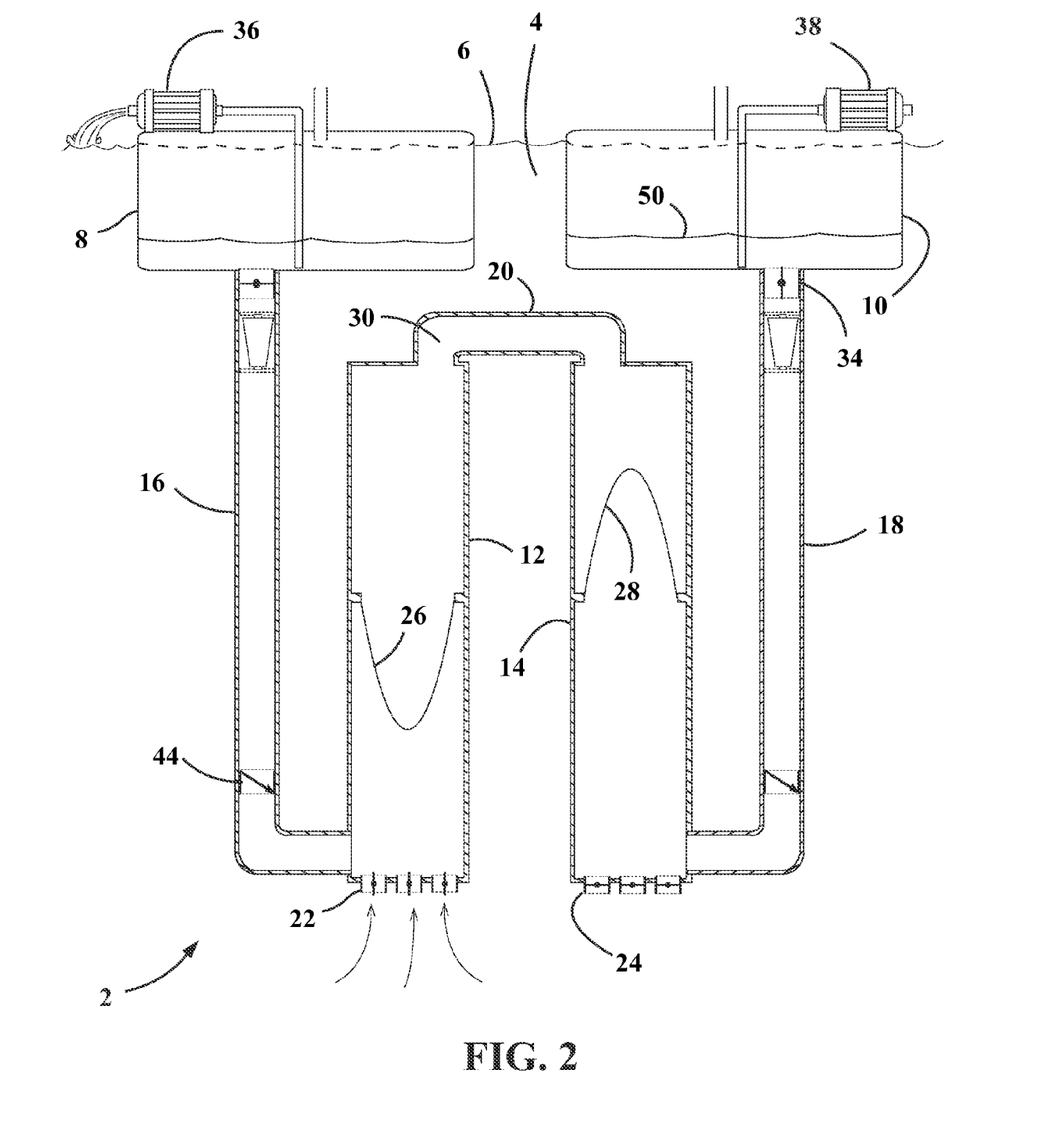
FIG. 2 depicts the embodiment shown in FIG. 1 at a further stage in the stroke.

Turning to FIG. 2, the first power chamber external valve 22 on the first power chamber 12 is opened, allowing higher-pressure water to flow into the first power chamber 12. It should be noted that efficiency might be increased by restricting flow between the first power chamber 12 and the first evacuation tube 16 just prior to and during the opening of the first power chamber external valve 22. Simultaneously or nearly simultaneous to the opening of the first power chamber external valve 22, the second holding tank valve 34 is opened. The empty second holding tank 10, which was recently emptied by the second holding tank pump 38, now experiences a pressure differential at the second holding tank valve 34 boundary. Consequently, the water in the power system 2 tends to flow in the direction of the second holding tank 10 in an attempt to return to equilibrium with the environment. The water level 50 begins to rise as water flows into the second holding tank 10 and will continue to rise until approximately even with the reservoir water level 6.

As the water flows into the first power chamber 12 from the reservoir 4, the volume of water in the lower portion of the first power chamber 12 increases, forcing the constant volumetric flow region 30 to shift towards the second power chamber 12 as the water in the lower portion of the second power chamber 12 flows into the second evacuation tube 18 and further into the second holding tank 10. During the filling process for the second holding tank 10, the first holding tank pump 36 can continue to evacuate the contents of the first holding tank 8 in isolation from the rest of the system 2. The second power chamber external valve 24 remains closed during this stroke of the cycle.

Figure 3:
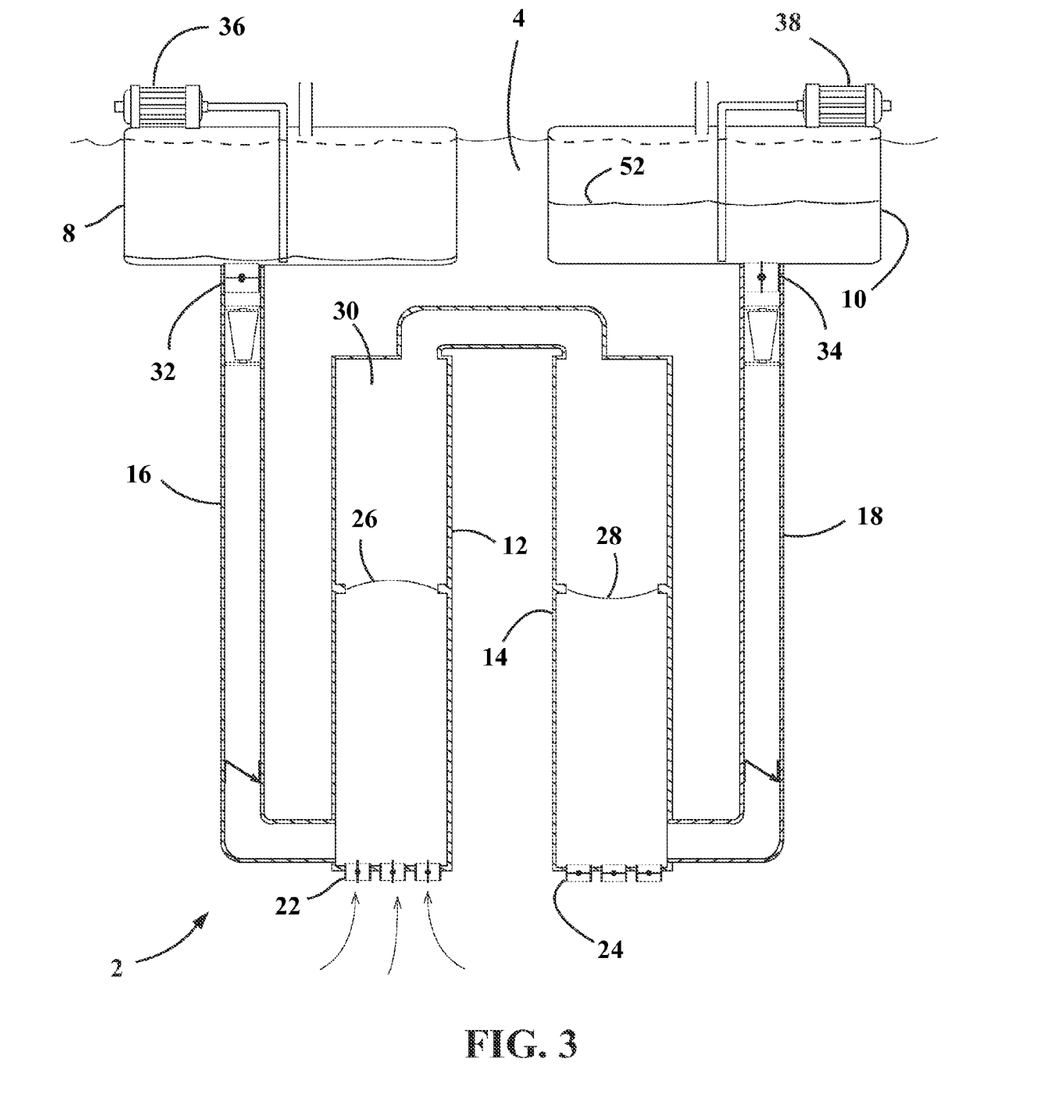
FIG. 3 depicts the embodiment shown in FIG. 1 at a yet further stage in the stroke.

Turning to FIG. 3, when the constant volumetric flow region 30 has shifted so that its contents are distributed roughly evenly between the first power chamber 12 and the second power chamber 14, the second holding tank 10 will be approximately halfway full, as shown by water level 52 in FIG. 3. The first power chamber external valve 22 and the second holding tank valve 34 remain open as water external to the system 2 flows into the first power chamber from the reservoir 4. The second power chamber external valve 24 and first holding tank valve 32 remain closed and do not allow water to flow. Alternatively, an evacuation tube door (not shown) would be closed leading to the first evacuation tube 16, while a second evacuation tube door (not shown) would be open leading to the second evacuation tube 18.

Figure 4:
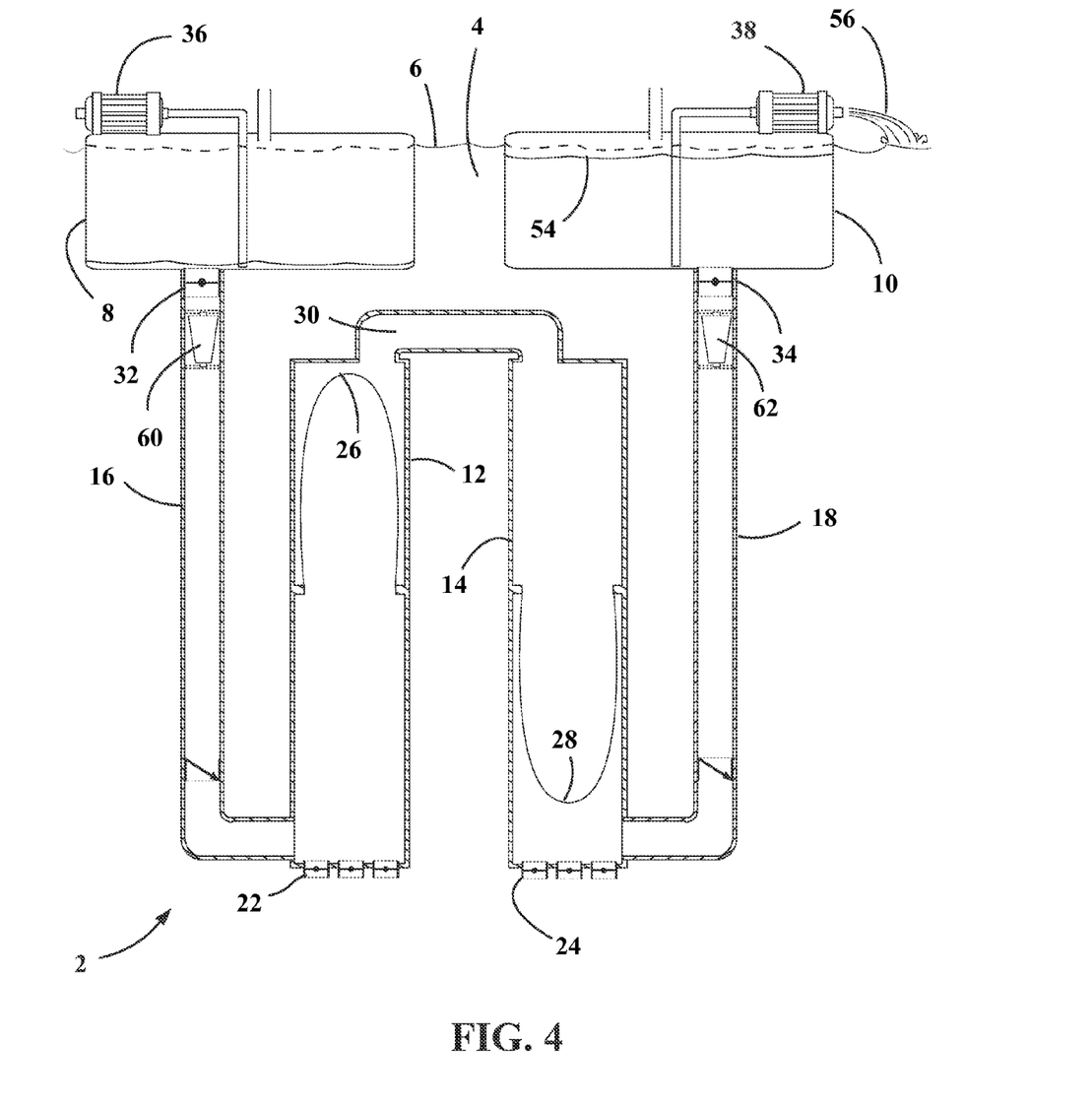
FIG. 4 depicts the embodiment shown in FIG. 1 at the end of the stroke.

Finally, the end of one stroke in the two-stroke cycle system 2 is depicted in FIG. 4. The second holding tank 10 has been filled or nearly filled so that its water level 54 is at or near the reservoir water level 6. The first power chamber external valve 22 and second holding tank valve 34 are closed, and the second holding tank pump 38 begins to evacuate the contents of the second holding tank 10. It should be noted that paddle-wheel type power units (not shown) may be placed within the exit stream 56 of the second holding tank pump 38 (and similarly for the first holding tank pump 36 during the second stroke) in order to provide a power source that does not restrict the internal flow of the system 2, thereby increasing the overall efficiency of the system 2.

At the end of the first stroke, the constant volumetric flow region 30 has shifted to reside mostly within the second power chamber 14 upper level, as shown by the expansion of the first 26 and second 28 elastic boundaries. Also at this point in the cycle, the evacuation of the first holding tank 8 should be complete, and the first holding tank pump 36 switched off. Water now rests at equilibrium pressures with respect to the external reservoir 4, filling the first 16 and second 18 evacuation tubes, the first 12 and second 14 power chambers, and the constant volumetric flow region 30. To begin the second stroke—a mirror image of the first—the second power chamber external valve 24 and first holding tank valve 32 are opened, similarly to the first power chamber external valve 22 and second holding tank valve 34 described in connection with FIG. 2. The opening of the first holding tank valve 32 will create a pressure gradient through the system 2 that is translated to the opening created by the actuation of the second power chamber external valve 24, thereby instigating the flow of water out of the first power chamber 12 and into the first holding tank 8.

Beginning with this basic proof-of-concept model, it should be noted that various flow energy converters, such as the first 60 and second 62 flow energy converters depicted in FIG. 4 (not labeled in FIGS. 1-3), may be placed within the system 2 such that the flow of water induced during a stroke is captured and converted into power, whether it be electric current, mechanical work, or the like. Therefore overall net efficiency of the system 2 shown in FIGS. 1-4 can thus be calculated by using the energy captured by flow energy conversion (e.g., with a water flow turbine of applicable type, as at 60 and 62), any additional power generation utilized at the exit stream (as at 56), and the energy input required to operate the first 36 and second 38 holding tank pumps.

Figure 5:
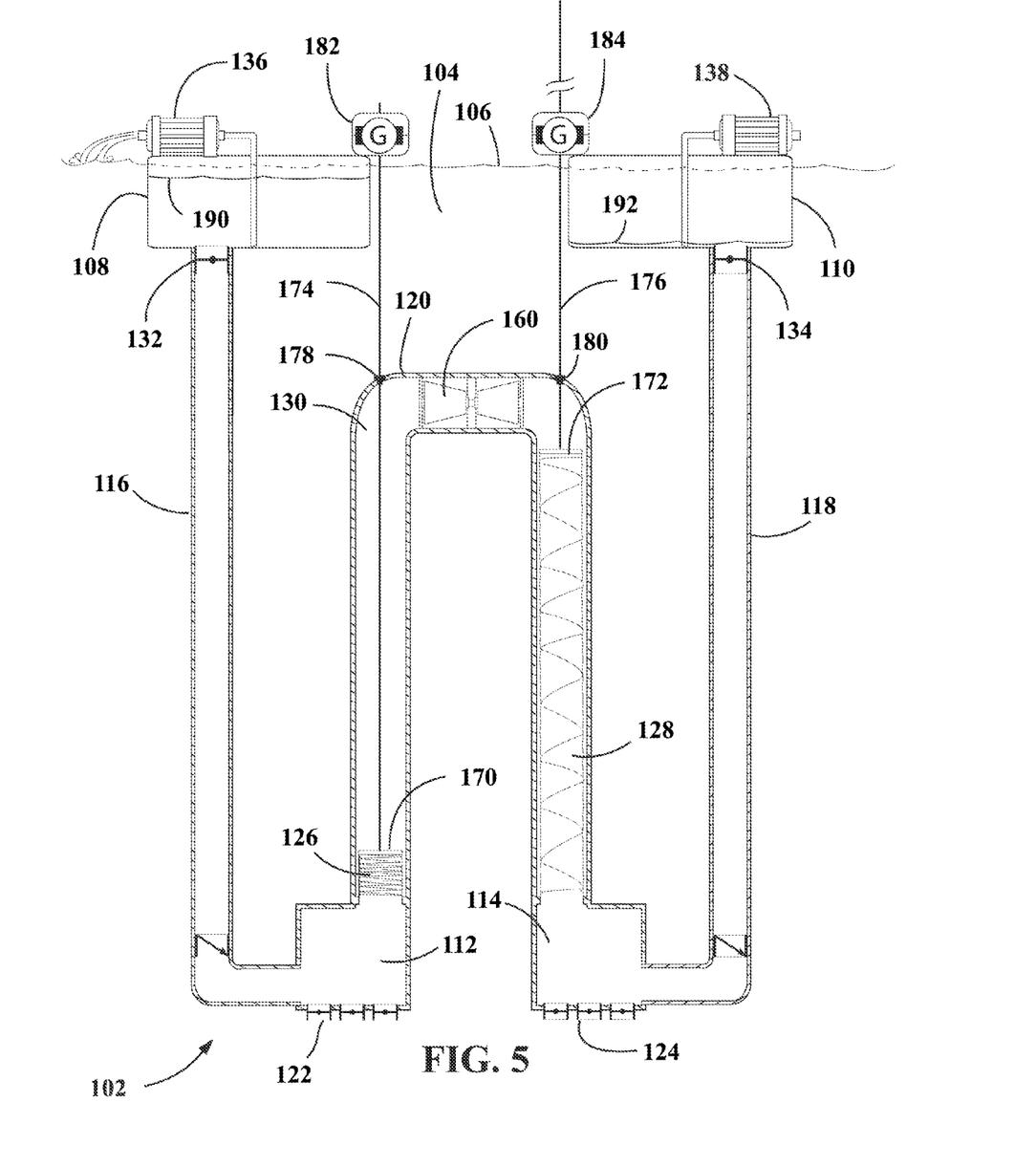
FIG. 5 depicts a second embodiment of the invention utilizing connecting rods and coil tubes to drive apparatus requiring work input, shown at the beginning of a stroke.
Figure 6:
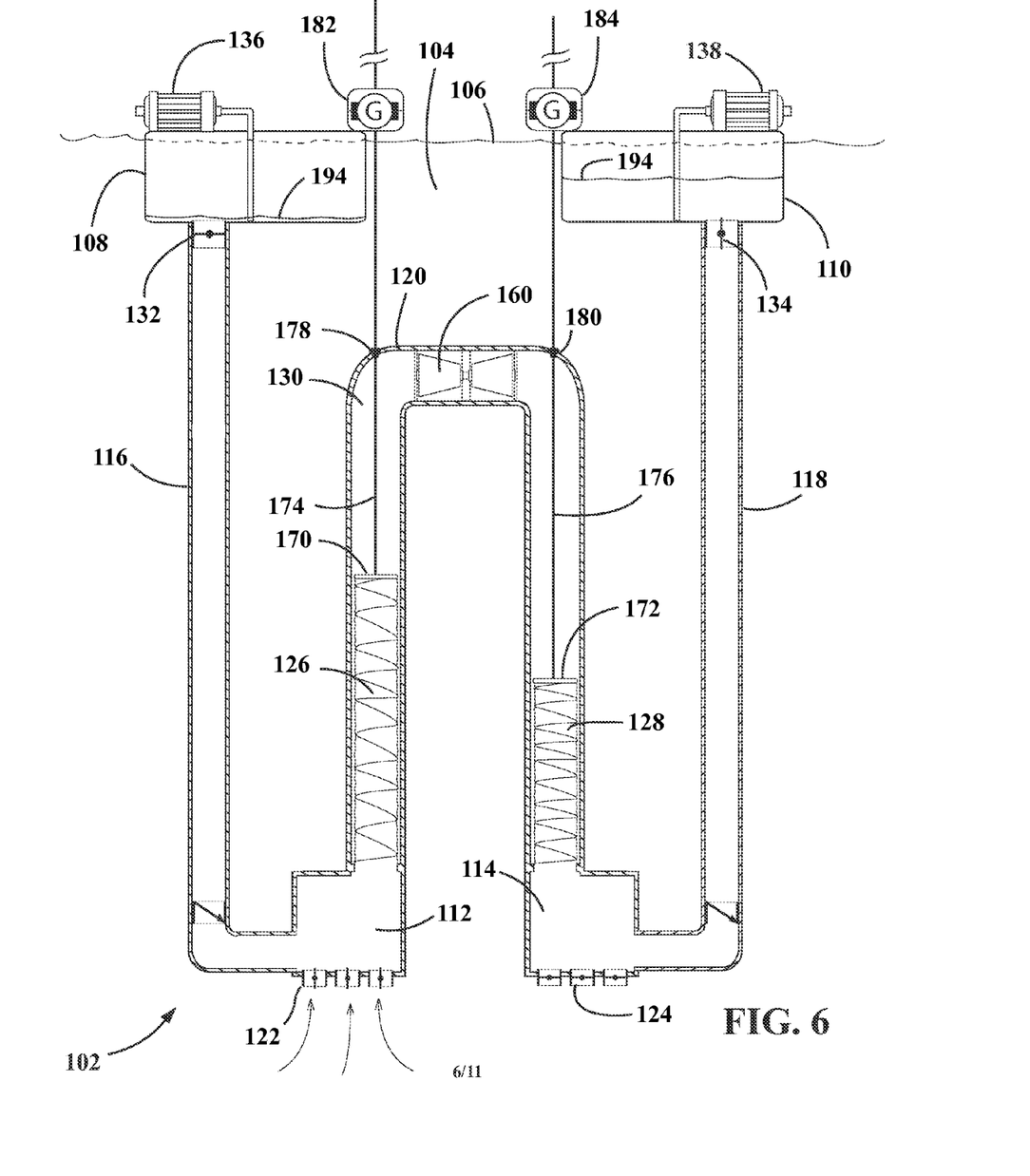
FIG. 6 depicts the embodiment shown in FIG. 5 at a further stage in the stroke.
Figure 7:
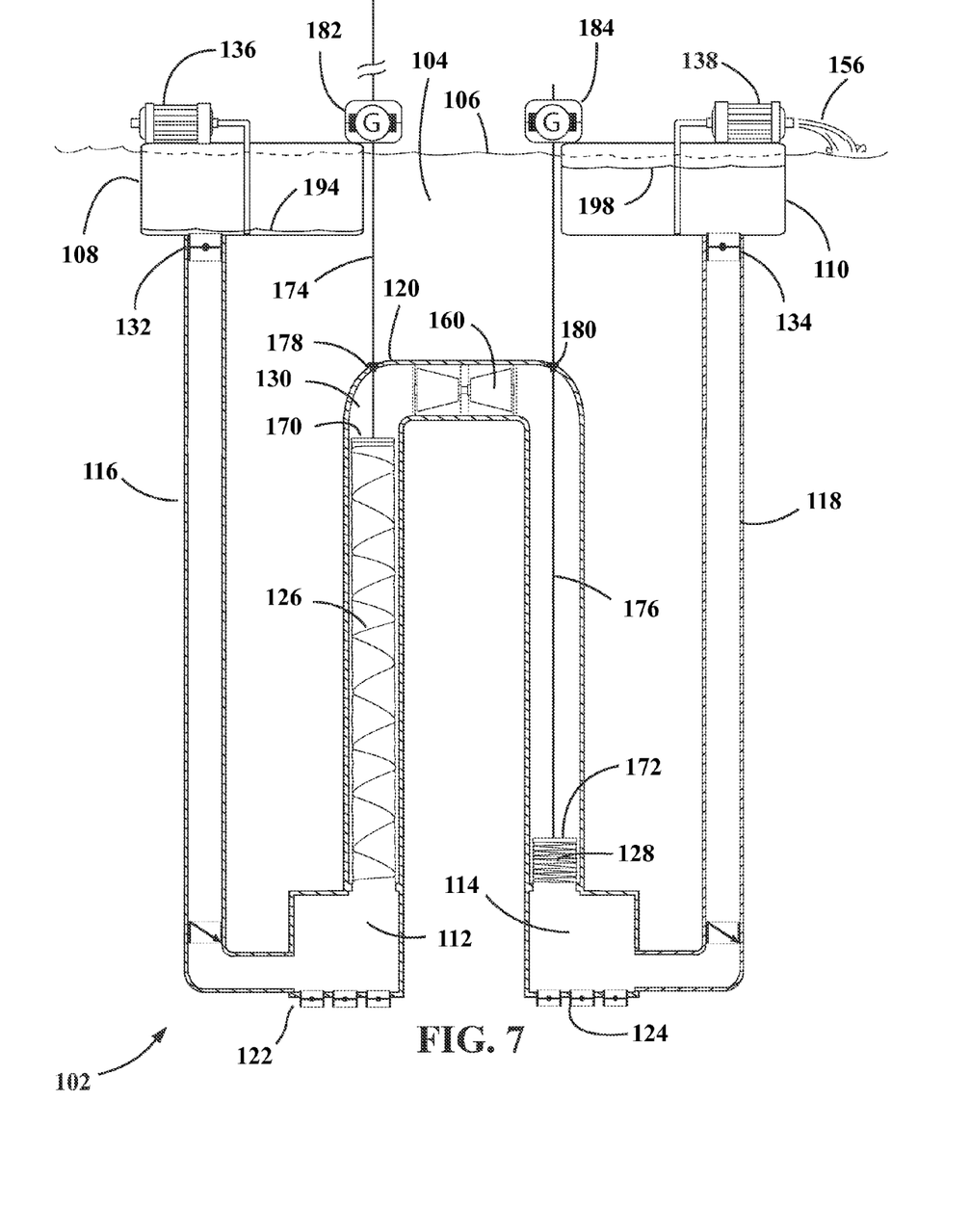
FIG. 7 depicts the embodiment shown in FIG. 5 at the end of the stroke.

Turning to FIGS. 5-7, a variation of the proof-of-concept model described in connection with FIGS. 1-4 is shown. Any optional features described in connection with FIGS. 1-4 and that are applicable to the embodiment shown in FIGS. 5-7 are considered optional features of the latter embodiment as well. Differences in their applications will be pointed out as necessary.

FIGS. 5-7 utilize a vertically elongate constant volumetric flow region to increase the travel distance of first 126 and second 128 coil tubes. Each coil tube is constructed of, for example, elastic or collapsible material encasing a collapsible spring-like structural frame. The expansion or contraction of the volume of water entering the first power chamber 112 will expand or contract the first coil tube 126, respectively, increasing or decreasing its overall length. The distal end of each coil tube is capped with a rigid plate: the first coil tube 126 is closed off with a first rigid plate 170, and the second coil tube 128 is capped off with a second rigid plate 172.

The first 126 and second 128 coil tubes inversely alternate between expanding and contracting as the constant volumetric flow region 130 is transferred back and forth between the first 112 and second 114 power chambers, in a manner similar to the alternating positioning of the first 26 and second 28 elastic boundaries depicted in FIGS. 1-4. As the coil tubes transition between their fully contracted (first coil tube 126 in FIG. 5) and fully expanded (second coil tube 128 in FIG. 5) states, the first 170 and second 172 rigid plates exhibit sinusoidal-type motion. By securing first 174 and second 176 connecting rods to the first 170 and second 172 rigid plates, respectively, the motion can be mechanically translated through the connecting rod 120 boundary with a gasket, as at 178 and 180.

The connecting rods can be attached to, for example, generators 182 and 184, and a generator axle or cam represented by two attachment points 182 and 184. The connecting rods can be generally be used to drive any apparatus that requires a work input, a crankshaft, mill, pump, or the like.

FIG. 5 depicts the beginning of a stroke in the two-stroke cycle. The first holding tank 108 is generally full of water and has been isolated from the rest of the system 102 as first holding tank valve 132 is closed. The first holding tank pump 136 has begun to evacuate the contents of the first holding tank 108, and will continue to do so during a portion of or up to the entire length of time for the stroke. The second holding tank 110 has been evacuated of its contents during the previous stroke by the second holding tank pump 138 and is ready to receive the water flowing into the system during the next stroke. Before the stroke begins, all valves restricting water flow are in the closed position, including the first 132 and second 134 holding tank valves and the first 122 and second 124 power chamber external valves.

The embodiment shown in FIGS. 5-7 is configured with an optional flow energy converter in the form of a reversible turbine 160, which can extract work from water flowing in both directions. By utilizing a reversible turbine placed in the flow stream in the connecting pipe 120, a single energy converter can be used to generator power.

Turning to FIG. 6, some time has passed since the first power chamber external valve 122 and the second holding tank valve 134 were opened. Water has begun to flow into the first power chamber 112 through the open first power chamber external valve 122 due to the empty second holding tank 110. The water in the system 102, again exposed to the ambient pressure gradient in the reservoir 104, begins to fill the second holding tank 110, as seen with water level 196 increased from the water level at the beginning of the stroke at 192 in FIG. 5. Water is in turn drawn up the evacuation tube 118 from the second power chamber 114, and consequently, the second coil tube 128 contracts as water is drawn from within. The contracting coil tube 128 carries the second rigid plate 172, which is attached to the second connecting rod 176. The movement of the connecting rod 176 can be used to perform work at the surface or below the apparatus if the connecting rods are inverted. The second connecting rod 176 can run, for example, a generator 184.

The contraction of the second coil tube 128 causes the constant volumetric flow region 130 to shift towards the second power chamber 114, causing water to flow through the optional reversible turbine 160. It should be noted that flow energy converters may be placed at various locations throughout the system in order to convert some of the flow energy into work external to the system. The size and amount of the flow energy converters may reduce the speed of a particular stroke, however, depending on the particular application.

The shifting constant volumetric flow region 130 draws the first coil tube 126 and the first rigid plate 170 upwards, driving the first connecting rod in the opposite direction of the second connecting rod 176. Similarly, the movement of the first connecting rod 174 can be used to perform work external to the system, in conjunction with, or independently of, the second connecting rod 176.

Finally, the expanding first coil tube 126 draws water into the first power chamber 112 through the first power chamber external valve 122, which can be configured as an array of valves, or as a single valve. As in FIGS. 1-4, it is referred to as a valve in the singular sense without limitation as to the amount of actual valves involved in a particular application. Many smaller, quick moving valves may be preferable over one or two large area valves, or vise versa.

FIG. 7 depicts the end of the stroke, wherein the second holding tank 110 has been completely or nearly completely filled with water, as shown by the water level 198 in FIG. 7. The first power chamber external valve 122 and second holding tank valve 134 are closed upon the filling of the second holding tank 110, and the second holding tank pump 138 is activated in order to drain the holding tank's contents. Note that the first holding tank pump 136 has completed draining the water from the first holding tank 108 as shown by water level 194. The second coil tube 128 has expelled its volume of water in the direction of the second holding tank 110 and is fully compressed. The first coil tube 126 is likewise fully expanded. To begin the next stroke, the second power chamber external valve 124 and the first holding tank valve 132 will be opened and the stroke will mirror the previously described stroke, completing a cycle.

At the transition between strokes there is no water flow through the connecting pipe 120, and any optional flow energy converters such as the reversible turbine 160 housed in the connecting pipe 120 cease producing power. Also, the first rigid plate 170 has reached its vertical apex, while the second rigid plate 172 has reached its vertical floor.

A third embodiment of the apparatus depicted in FIGS. 8-11 utilizes pontoons contained within pontoon chambers to enhance and augment the power derived from the water flowing through the system 202. For relatively little power investment, the pontoons enable the system 102 to greatly augment the work performed by the connecting rods external to the 102.

Figure 8:
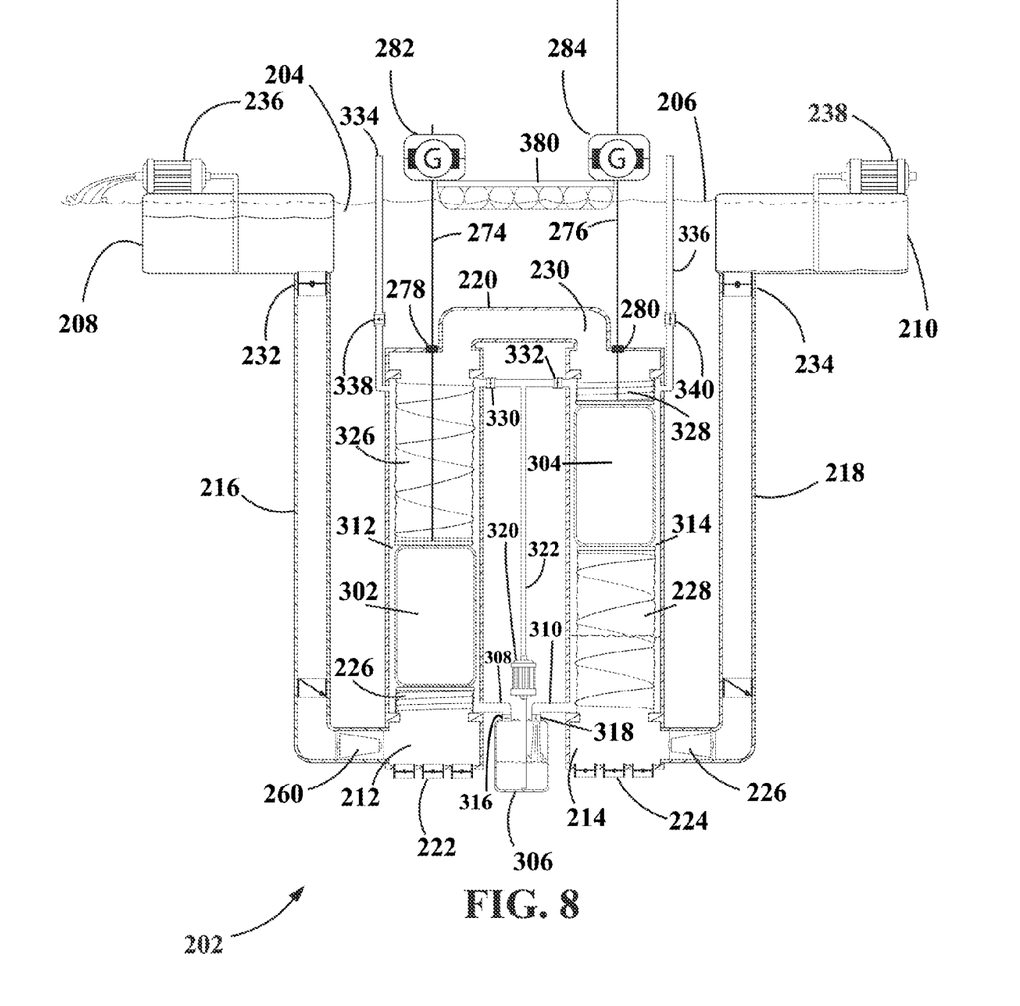
FIG. 8 depicts a third embodiment of the invention utilizing pontoons to enhance the power generated by the system, shown at the beginning of a stroke.

FIG. 8 depicts an arrangement similar to that shown in FIGS. 5-7, but with modifications to the regions between the first 216 and second 218 evacuation tubes. The movable extremes of the constant volumetric flow region 230 are rigid plates affixed to and capping the end of a first 326 and second 328 upper pontoon chamber coil tube. As the constant volumetric flow region shifts from one pontoon chamber to the other, the first 326 and second 328 upper pontoon chamber coil tubes alternate in their expansion and contraction, maintaining a constant volume of water within the coil tubes and connecting pipe 220. As in FIGS. 5-7, the first 212 and second 214 power chambers can also volumetrically expand via a first 226 and second 228 lower pontoon chamber coil tube as water enters through their respective first 222 and second 224 power chamber external valves.

First 274 and second 276 connecting rods pass through gaskets 278 and 280 and are connected to an external device requiring power input. The external device can be, for example, generators 282 and 284 positioned on platform 380 as shown in FIGS. 8-11, a large pump, or the like. The movement of the rigid plates that are connected to the first 326 and second 328 upper pontoon chamber coil tubes drives the connecting rods.

A first pontoon 302 is positioned between the first upper 326 and lower 226 pontoon chamber coil tubes. A second pontoon 304 is positioned between the second upper 328 and lower 228 pontoon chamber coil tubes. Each of the first 302 and second 304 pontoons is contained within a first 312 and second 314 pontoon chamber, respectively. The first pontoon chamber 312 is vented to atmospheric pressure via a first pontoon chamber air vent 334 and is actuatable through a first pontoon chamber air vent valve 338. The second pontoon chamber 314 is vented to atmospheric pressure via a second pontoon chamber air vent 336 that is likewise actuatable through a second pontoon chamber air vent valve 340.

When the pontoons are configured to be filled with air, the air vents allow the pontoon chambers to be filled with air at atmospheric pressure, which surrounds the pontoons. On a down stroke, in which a pontoon moves from its vertical apex in the cycle to its vertical floor, the encapsulation of the pontoon with air reduces or negates the buoyant forces acting upon the pontoon. This effect makes the energy required to return the pontoon to its position at the bottom of the pontoon chamber relatively small compared to the energy increase achieved through the use of pontoons on the upstroke.

Alternatively, the pontoons can be filled with the liquid that fills the fluid reservoir 204. In the case of water, filling the pontoons with water will allow for the effect of neutral buoyancy to greatly assist in returning the pontoons to their vertical apex during a cycle. In this configuration, the pontoons will augment the power generated by the system during the down stroke, when the pontoon's individual weight will contribute additive force to the connecting rod.

In the examples and illustrations that follow, the pontoon systems are filled with air unless otherwise specified. The use of air need not be limiting, however, as will be evident with further explanation. Air- and water-filled pontoons are used for illustrative simplicity, but any material can be used to create the structure of the pontoons. The pontoons can be hollow, solid, or semi-permeable, because it is the buoyant relationship between the pontoon body (whether filled, empty, or solid) and the liquid, gas, or combination of both, that provides the Drummer Boy with its ability to do work at low energy input levels. For example, in addition to a hollow pontoon filled with air, water, or nothing, the pontoon could be made out of (or filled with) wood (e.g., balsa wood), cork, metal, plastic, Styrofoam or any other material that is suitable for a particular application. Once the principles of the current invention are understood, those skilled in the art employing these teachings will be able to select such appropriate materials without undue experimentation or further invention.

In the embodiment shown in FIGS. 8-11, the pontoons are assumed to be filled with air. Other configurations are of course possible, and their method of operation will become evident after reading this disclosure. While the pontoon chamber air vents enable the pontoon chambers to be filled with air, the pontoon chamber filling pipe 322 connects to a pontoon chamber filling pump 320. The pump 320 is connected to both a first 330 and second 332 pontoon chamber filling pipe valve, which are used to control into which pontoon chamber the pump 322 pumps. A first 308 and second 310 pontoon chamber drain pipe and a first 316 and second 318 drain pipe valve allow water to be drained from the first 312 and second 314 pontoon chambers, respectively, when neutral buoyancy with an air pontoon is desired. A pontoon chamber reservoir 306 is used to store the pontoon chamber water when not in use. The pontoon chamber water is relatively small when compared to the volumes present in other elements of the apparatus. The pontoon chamber filling pump 320 draws water from the pontoon chamber reservoir 306 as needed to return water to a pontoon chamber.

FIG. 8 depicts the beginning of a stroke for the two-stroke cycle. The holding tank valves 232 and 234 are closed, as well as the power chamber external valves 222 and 224. The first holding tank 208 is full or nearly full, and the first holding tank pump 236 has begun to evacuate the contents of the tank. The first pontoon 302 rests at its lowest point, with the first lower pontoon chamber coil tube 226 fully contracted and the first upper pontoon chamber coil tube 326 fully extended. Likewise, the second lower pontoon chamber coil tube 228 is fully extended and the second upper pontoon chamber coil tube 328 is fully contracted. The constant volumetric flow region 230 is shifted towards the first power chamber 212 relative to the second power chamber 214.

The first pontoon chamber 312 is filled with water, and the first pontoon chamber air vent valve 338, filling pipe valve 330, and drain pipe valve 316 are all closed. The second pontoon chamber drain pipe valve 318 is open, and the water has begun to drain out of the second pontoon chamber 314 and into the pontoon chamber reservoir 306.

Figure 9:
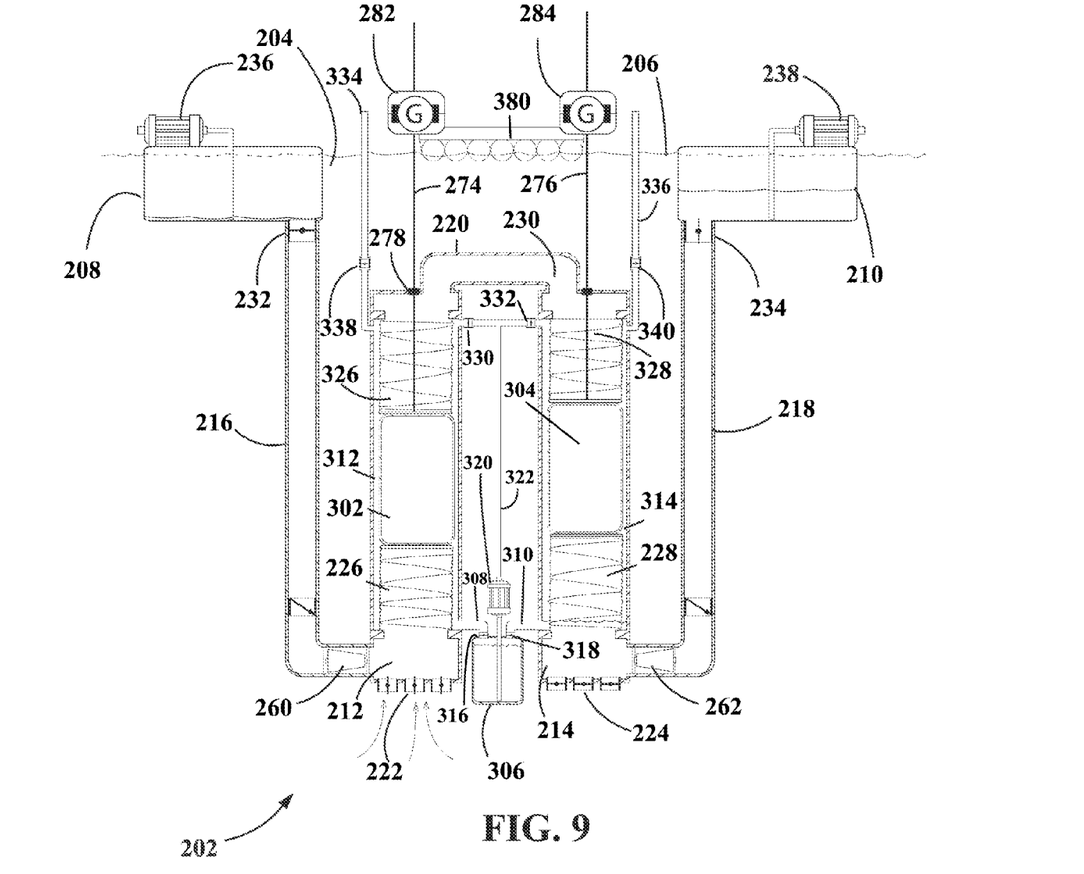
FIG. 9 depicts the embodiment shown in FIG. 8 at a further stage in the stroke.

Turning to FIG. 9, a state of the system 202 is shown at a time during the stroke beginning in FIG. 8. The first power chamber external valve 222 and the second holding tank valve 234 are open and water from the fluid reservoir 204 has begun to flow into the first power chamber 212. The first lower pontoon chamber coil tube 226 has expanded from its fully retracted state (shown in FIG. 8), and the first upper pontoon chamber coil tube 326 has retracted from its fully extended state (also shown in FIG. 8) as the constant volumetric flow region 230 has shifted toward the second power chamber 214. Likewise, the second upper pontoon chamber coil tube 328 has expanded and the second lower pontoon chamber coil tube 228 has retracted from the state shown in FIG. 8. Seeking equilibrium with the fluid reservoir 204 fluid level 206, fluid with the system 202 has begun to fill the second holding tank 210 via the second evacuation tube 218.

The water surrounding the second pontoon 304 has been fully drained from the second pontoon chamber 314 into the pontoon chamber reservoir 306, thereby negating buoyant forces that would resist the downward movement of the second pontoon 304.

The first 316 and second 318 drain pipe valves and the first 330 and second 332 pontoon chamber filling pipe valves are all closed in this state. The first pontoon 302 is in upwards motion and the second pontoon 304 is in downwards motion. The upwards motion of the first pontoon 302 is used to operate a device requiring work input. The device could be, for instance, one or more power generators such as 282 and 284, or other mechanical devices such as crankshafts, pumps, mills and the like. The connecting rod system enables the motion of the pontoons and constant volumetric region to mechanically perform work as desired using, for instance, first 274 and second 276 connecting rods.

Figure 10:
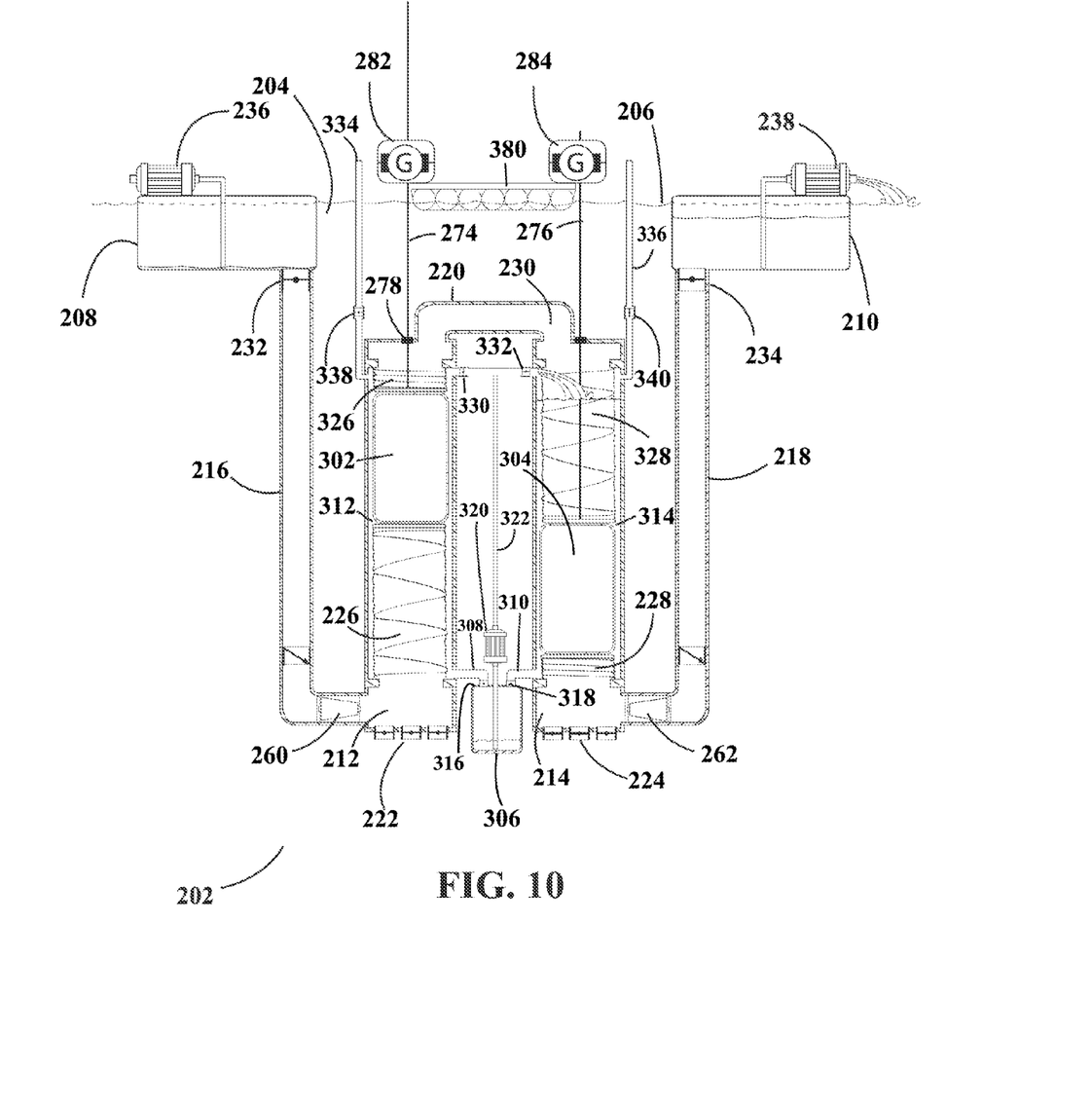
FIG. 10 depicts the embodiment shown in FIG. 8 at the end of the stroke.

FIG. 10 depicts the end state of the stroke begun in FIG. 8. In this state, the first pontoon 302 has traveled to its vertical apex and the second pontoon 304 to its vertical floor. The first upper pontoon chamber coil tube 326 and the second lower pontoon chamber coil tube 228 are fully retracted, and the first lower pontoon chamber coil tube 226 and the second upper pontoon chamber coil tube 328 are fully extended. The first power chamber external valve 222 and second holding tank valve 234 have been closed. The second holding tank 210 is now full, or nearly full, and is isolated from the rest of the system 202. The second holding tank pump 238 has begun to return the fluid in the second holding tank 210 to the fluid reservoir 204.

At or near the end of the stroke, the pontoon chamber filling pump 320 begins to refill the second pontoon chamber 314 to prepare for the next stroke, wherein the second pontoon 304 will move upwards in its power stroke. The second pontoon chamber filling pipe valve 332 has been opened to allow the fluid in the pontoon chamber reservoir 306 to be pumped into the second pontoon chamber 314.

Figure 11:
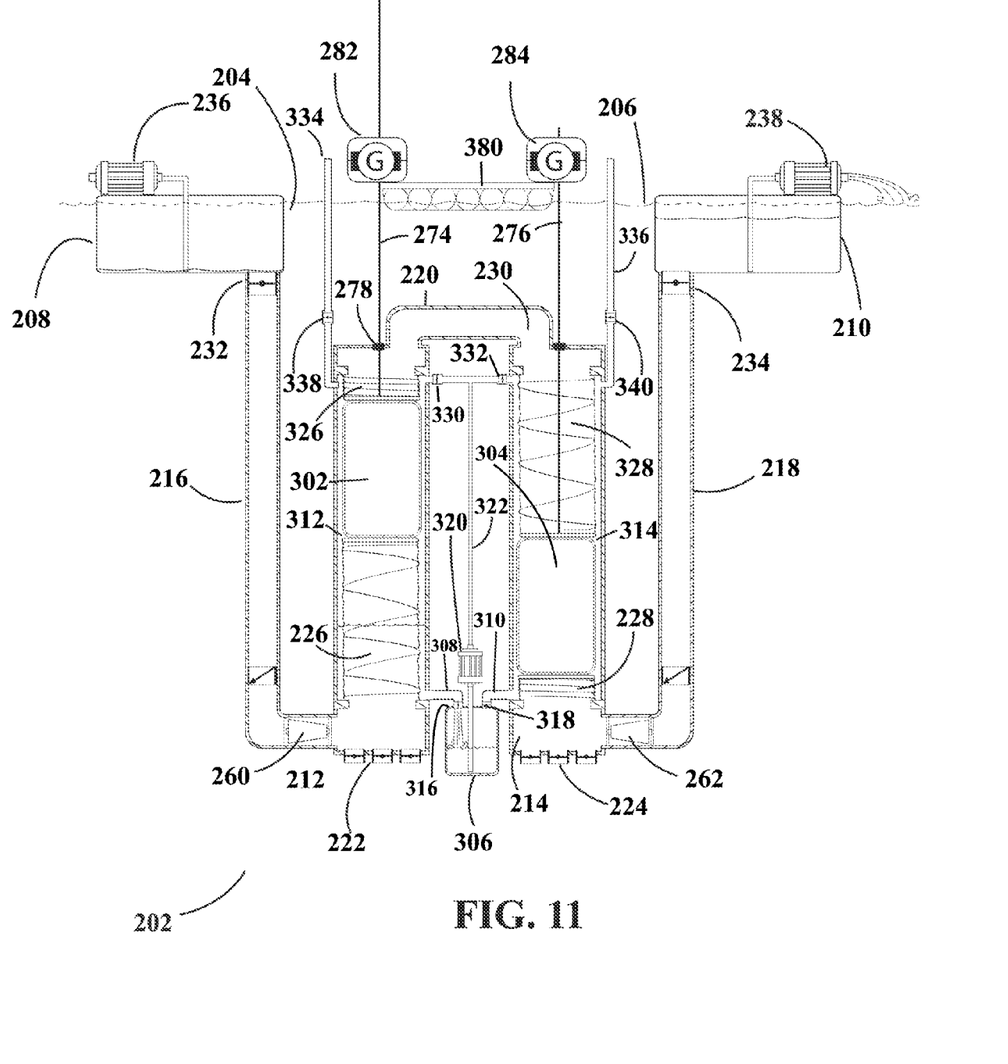
FIG. 11 depicts the embodiment shown in FIG. 8 at a transition state between the stroke transitioned as shown in Figs. 8-10 and the beginning of a reciprocating stroke.

FIG. 11 depicts a state just before the beginning of the next stroke. The second pontoon chamber 314 has been refilled by the pontoon chamber filling pump 320 and the second pontoon chamber filling pipe valve 332 closed. The first drain pipe valve 316 has been opened and the fluid in the first pontoon chamber 312 is nearly fully drained in preparation of the first pontoon 302 returning back to its vertical floor as shown in FIG. 8. At the start of the next stroke, the second power chamber external valve 224 and the first holding tank valve 323 will be opened, and the first drain pipe valve 316 will be closed. These reciprocating strokes described herein will continue cycling as described, generating work for power generation or the like.

The movement of the pontoons can be used to operate a generator system that produces electricity. The water entering the power plant and the water being evacuated by the plant's pumping systems cause the pontoons to move. The water entering the power plant also is used to pressurize the water in the power plant to equal or nearly equal the adjacent outside water pressure at the point of discharge. Since the water being evacuated is equal or nearly equal to the water it is being evacuated into, the pumping system's required work expenditure becomes diminished. Therefore, if the head of the water entering the power plant is 100 feet and the water being evacuated has had its pressure equalized or nearly equalized with the outside ocean water at the point of discharge, then it will only take a few psi to evacuate the water from the power plant, compared with having to discharge water at atmospheric pressure into water pressure that is much higher at the point of discharge.

The term "return station" refers to a portion of the return system that evacuates the material from its respective power or pontoon chamber, generally beginning at the proximal end of an evacuation tube. A return system generally carries out the task of evacuating the material exiting its respective chamber (either during or after the emptying process of the pontoon chamber, or some combination of both). Any given return system can be made up of multiple return stations, which are individual pumping systems contained within a return system (e.g., holding tank and holding tank pump). It should be evident to the skilled artisan that the variations shown in connection with these figures may be applied in conjunction with the multitude of applications and examples disclosed previously herein. While employing the variations that follow will slightly alter the operative sequences of the systems and allow for power generation at greater rates, the basic principles remain the same—natural pressure differentials are being used to reduce the workload needed to evacuate the system of material, while simultaneously using the material flow to generate power. If there are multiple return stations connected to each pontoon chamber, and they take turns evacuating the appropriate amount of water from their respective pontoon chambers, then each return station will have more time to evacuate its water content after being isolated from the pontoon chamber assembly. The time savings result because as one return station evacuates its water content from its holding chamber, the others are receiving the subsequent strokes' water expelled from the corresponding pontoon chamber in alternating sequence. This also allows the power plant to run continuously, and at an added energy savings due to the reduced flow rate requirements.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above compositions and methods without departing from the scope of the invention herein involved, it is intended that all matter contained in the above descriptions and examples or shown in the accompanying drawings shall be interpreted as illustrative and not in a limiting sense. In this application all units are in the metric system and all amounts and percentages are by weight, unless otherwise expressly indicated. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

I claim:

1. An apparatus for generating power from a fluid in a reservoir, comprising:
    a power station comprising:
        a first power chamber having an external valve actuatable to control flow of the fluid between the reservoir and the first power chamber;
        a second power chamber having an external valve actuatable to control flow of the fluid between the reservoir and the second power chamber; and
        a connecting pipe coupled to the first power chamber and the second power chamber thereby enabling fluid flow between the chambers;
    a return system comprising:
        a first return station in fluid receiving connection with the first power chamber at a first attachment point, comprising:
            a first evacuation tube having proximal and distal ends, wherein the first evacuation tube proximal end operably connects the first return station to the first attachment point;
            a first holding tank in fluid receiving connection with the first evacuation tube distal end; and
            a first holding tank pump adapted to return fluid received into the first holding tank from the first power chamber to the reservoir; and
        a second return station in fluid receiving connection with the second power chamber at a second attachment point, comprising:
            a second evacuation tube having proximal and distal ends, wherein the second evacuation tube proximal end operably connects the second return station to the second attachment point;
            a second holding tank in fluid receiving connection with the second evacuation tube distal end; and
            a second holding tank pump adapted to return fluid received into the second holding tank from the second power chamber to the reservoir; and
    a flow energy converter positioned within the power generating apparatus thereby converting flow energy into work done externally by the power generating apparatus.

2. The apparatus of claim 1, wherein the flow energy converter is a water turbine.

3. An apparatus for generating power from a fluid in a reservoir, comprising:
    a power station comprising:
        a first power chamber having a first movable boundary and an external valve actuatable to control flow of the fluid between the reservoir and the first power chamber;
        a second power chamber having a second movable boundary an external valve actuatable to control flow of the fluid between the reservoir and the second power chamber;
        a connecting pipe coupled to the first power chamber and the second power chamber; and
        a constant volumetric flow region defined by the first and second movable boundaries, wherein the first and second movable boundaries move synchronously, thereby maintaining the volume of the constant volumetric flow region during movement induced by pressure differentials in the power station;
    a return system in switchable fluid receiving connection with the first and second power chambers at a first and second attachment point, respectively; and
    a means for mechanically driving a work input apparatus from movement of said first and second movable boundaries.

4. The apparatus of claim 3, wherein the return system further comprises:
    a first return station comprising:
        a first evacuation tube having proximal and distal ends;
        a first holding tank in fluid receiving connection at an inlet with the first evacuation tube distal end; and
        a first holding tank pump adapted to return fluid received into the first holding tank from the first power chamber to the reservoir,
        wherein the first evacuation tube proximal end operably connects the first return station to the first power chamber at the first attachment point, and
    a second return station comprising:
        a second evacuation tube having proximal and distal ends;
        a second holding tank in fluid receiving connection at an inlet with the second evacuation tube distal end; and
        a second holding tank pump adapted to return fluid received into the second holding tank from the second power chamber to the reservoir,
        wherein the second evacuation tube proximal end operably connects the second return station to the second power chamber at the second attachment point.

5. The apparatus of claim 4, further comprising:
a first holding tank valve at the first holding tank inlet; and
a second holding tank valve at the second holding tank inlet.

6. The apparatus of claim 5, further comprising:
a first coil tube having fixed and free ends, the fixed end thereof being secured to an interior wall of the first power chamber and having a rigid plate at the free end thereof, thereby forming the first movable boundary; and
a second coil tube having fixed and free ends, the fixed end thereof being secured to an interior wall of the second power chamber and having a rigid plate at the free end thereof, thereby forming the second movable boundary, wherein the means for mechanically driving a work input apparatus comprises a connecting rod system.

7. The apparatus of claim 6, wherein the connecting rod system further comprises:
a first connecting rod having proximal and distal ends; and
a second connecting rod having proximal and distal ends,
wherein the first connecting rod proximal end is connected to the rigid plate of the first coil tube and the second connecting rod proximal end is connected to the rigid plate of the second coil tube, and
wherein the first connecting rod distal end is drivably connected to a first input of a power generation apparatus and the second connecting rod distal end is drivably connected to a second input of the power generation apparatus, or
the first connecting rod distal end is drivably connected to a first power generation apparatus and the second connecting rod distal end is drivably connected to a second power generation apparatus.

8. The apparatus of claim 6, wherein the connecting rod system generates reciprocating motion to mechanically drive the work input apparatus due to synchronous movement of the first and second movable boundaries.

9. The apparatus of claim 5, further comprising:
a first pontoon having upper and lower ends;
a first upper coil tube having fixed and free ends, the fixed end thereof being secured at a first upper seal to an interior wall of the first power chamber and at the free end thereof to the first pontoon upper end, thereby forming the first movable boundary;
a first lower coil tube having fixed and free ends, the fixed end thereof being secured at a first lower seal to the interior wall of the first power chamber below the first upper seal and at the free end thereof to the first pontoon lower end, whereby the first upper seal and the first lower seal define a first pontoon chamber;
a second pontoon having upper and lower ends;
a second upper coil tube having fixed and free ends, the fixed end thereof being secured at a second upper seal to an interior wall of the second power chamber and at the free end thereof to the second pontoon upper end, thereby forming the second movable boundary;
a second lower coil tube having fixed and free ends, the fixed end thereof being secured at a second lower seal to the interior wall of the second power chamber below the second upper seal and at the free end thereof to the second pontoon lower end, whereby the second upper seal and the first lower seal define a second pontoon chamber;
a means for reciprocally draining and filling the first and second pontoon chambers.

10. The apparatus of claim 9, wherein the means for mechanically driving a work input apparatus comprises a connecting rod system.

11. The apparatus of claim 10, wherein the connecting rod system generates reciprocating motion to mechanically drive the work input apparatus due to synchronous movement of the first and second movable boundaries.

12. The apparatus of claim 10, further comprising:
a first connecting rod having proximal and distal ends; and
a second connecting rod having proximal and distal ends,
wherein the first connecting rod proximal end is connected to the first pontoon and the second connecting rod proximal end is connected to the second pontoon, and
wherein the first connecting rod distal end is drivably connected to a first input of a work input apparatus and the second connecting rod distal end is drivably connected to a second input of the work input apparatus, or
the first connecting rod distal end is drivably connected to a first work input apparatus and the second connecting rod distal end is drivably connected to a second work input apparatus.

13. The apparatus of claim 11, further comprising:
a first connecting rod having proximal and distal ends; and
a second connecting rod having proximal and distal ends,
wherein the first connecting rod proximal end is connected to the first pontoon and the second connecting rod proximal end is connected to the second pontoon, and
wherein the first connecting rod distal end is drivably connected to a first input of a power generation apparatus and the second connecting rod distal end is drivably connected to a second input of the power generation apparatus, or
the first connecting rod distal end is drivably connected to a first power generation apparatus and the second connecting rod distal end is drivably connected to a second power generation apparatus.

14. The apparatus of claim 10, wherein the means for reciprocally draining and filling the first and second pontoon chambers comprises:
a pontoon chamber reservoir;
a first pontoon chamber drain pipe connecting the first pontoon chamber to the pontoon chamber reservoir;
a second pontoon chamber drain pipe connecting the second pontoon chamber to the pontoon chamber reservoir; and
a pontoon chamber filling pump connected at a pump inlet to the pontoon chamber reservoir and at a pump outlet to the first pontoon chamber and the second pontoon chamber wherein the pump outlet is switchable therebetween.

15. The apparatus of claim 14, wherein the connecting rod system generates reciprocating motion to mechanically drive the work input apparatus due to synchronous movement of the first and second movable boundaries.

* * * * *